United States Patent
Suzuki et al.

(10) Patent No.: US 8,035,923 B2
(45) Date of Patent: Oct. 11, 2011

(54) DATA STORAGE DEVICE

(75) Inventors: Hiroyuki Suzuki, Kanagawa (JP);
Teruhiro Nakamiya, Kanagawa (JP);
Takashi Kouno, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 566 days.

(21) Appl. No.: 12/287,467

(22) Filed: Oct. 8, 2008

(65) Prior Publication Data

US 2009/0097163 A1    Apr. 16, 2009

(30) Foreign Application Priority Data

Oct. 12, 2007  (JP) .................. 2007-267240

(51) Int. Cl.
*G11B 5/48*  (2006.01)

(52) U.S. Cl. .................. 360/245.8; G9B/5.147; 439/83

(58) Field of Classification Search ............... 360/245.8; 439/83; G9B/5.147
See application file for complete search history.

(56) References Cited

U.S. PATENT DOCUMENTS

| | | | | |
|---|---|---|---|---|
| 6,036,507 A | * | 3/2000 | Knighton et al. | ............... 439/79 |
| 6,824,418 B2 | * | 11/2004 | Kobayashi | ................... 439/374 |
| 2005/0068666 A1 | | 3/2005 | Albrecht et al. | |
| 2007/0223148 A1 | * | 9/2007 | Ding et al. | .................... 360/323 |

FOREIGN PATENT DOCUMENTS

| | | |
|---|---|---|
| JP | 2000-141078 | 5/2000 |
| JP | 3562891 | 6/2004 |
| JP | 2007-105750 | 4/2007 |

OTHER PUBLICATIONS

Nagaskai et al. "The Third Face of Tin" Solid Physics 1 ,1967.
Koyama et al. "The Simple Hexagonal to β-Sn Martensitic Transition in Sn-(7.0-9.5) at % in Alloys" Acta Metal. vol. 37, No. 2, pp. 597-602, Printed in Great Britain, 1989.
Desk Handbook: Phase Diagrams for Binary Alloys, ASM International, Materials Perk, OH, p. 491, 2000.

* cited by examiner

*Primary Examiner* — Hoai v Ho
(74) *Attorney, Agent, or Firm* — Zilka-Kotab, PC

(57) ABSTRACT

Embodiments of the present invention help to provide a sealed hard disk drive (HDD) with high reliability. According to one embodiment, a HDD is a hermetically sealed HDD. A base has an opening of a through-hole on its bottom; a feedthrough is provided so as to close the opening. A flange of the feedthrough has a larger outline than the opening, and its rim is joined to the base with solder at the solder joint. The solder at the solder joint is mainly composed of Sn and contains 15 atomic percent to 27 atomic percent of indium. This solder reaches the γ phase from −150° C. to 120° C. Accordingly, even if the HDD has been exposed at low temperature for a long time, the solder joint is not broken so that helium gas does not leak.

12 Claims, 7 Drawing Sheets

DATA STORAGE DEVICE

CROSS-REFERENCE TO RELATED APPLICATION

The instant nonprovisional patent application claims priority to Japanese Patent Application No. 2007-267240 filed Oct. 12, 2007 and which is incorporated by reference in its entirety herein for all purposes.

BACKGROUND OF THE INVENTION

Hard disk drives (HDDs) rotate magnetic disks and drive head gimbal assemblies (HGAs) at high speed in response to requests for huge capacity, high recording density, and high-speed accessing. These cause fluctuation of air (turbulence) to buffet the magnetic disks and HGAs. This turbulence buffeting will disturb positioning a head for reading data which have been recorded with high density on a magnetic disk. This is because the turbulence occurs at random and it is difficult to estimate its magnitude and cycle so that swift and accurate positioning control will be complex and difficult. Also, the turbulence buffeting may cause a noise to impair the quietness of the device.

Another problem caused by influence of the air within the device due to the high speed rotation other than the foregoing, is increased electric power consumption. When a magnetic disk is rotated at high speed, the air around the disk is dragged and rotated together. On the other hand, the air apart from the magnetic disk remains still so that shearing force arises therebetween to become a load against the rotation of the disk. This is called a windage loss, which becomes larger as the disk rotates at higher speed. In order to rotate the disk at high speed against the windage loss, a motor will require a larger output and electric power.

Given that the above-described turbulence and windage loss are proportional to the density of the gas within the device, there is an idea to reduce the turbulence and windage loss by enclosing low-density gas instead of air in a hermetically sealed HDD. Hydrogen, helium, or the like is exemplified as the low density gas, but helium is optimum because it is effective, stable, and safe in considering actual use. HDDs with sealed helium gas can overcome the above-described problems and accomplish swift and accurate positioning control, electric power saving, and satisfactory quietness.

However, molecules of helium are extremely small and a diffusion coefficient of helium is large. Therefore, there has been a problem that enclosures used in common HDDs are poorly sealed so that helium gas leaks easily during normal use. In order to make it possible to hermetically seal low density gas like helium gas, a technique disclosed in U.S. Patent Publication No. 2005/0068666 ("Patent Document 1") has been suggested as described below.

Patent Document 1 discloses a magnetic disk device in which a feedthrough for connecting an FPC assembly inside the enclosure and a circuit board outside the enclosure is attached to an opening of the base and the enclosure is hermetically sealed by a cover. With respect to the joint section of the base and the cover through which the helium inside the enclosure is likely to be leaked, the aluminum die-casted base and the aluminum cover are laser-welded so as to securely seal the joint section. With respect to the attaching section of the feedthrough through which the helium inside the enclosure is likely to be leaked, the feedthrough is constituted by a flange and a plurality of pins fixed to the flange with sealants of glass or the like, and the flange is soldered to the rim of the opening on the bottom surface of the base so as to completely seal the attaching section.

As described above, the pins of the feedthrough are fixed to the flange with sealants. Glass is frequently used as the sealants, but the thermal expansion coefficient of the glass is significantly different from the one of aluminum used in the base. In order to avoid a break in a sealant due to thermal stress, the thermal expansion coefficient of the flange is preferably between the ones of the sealants and the base.

Since the thermal expansion coefficient of the flange is different from the one of the base, large thermal stress is applied to a solder joint between the flange and the base due to change in environmental temperature. On the other hand, the solder used for joining the feedthrough and the base has small material yield stress. For this reason, it is important to assure sufficient solder joining reliability between the feedthrough and the base for the thermal stress accompanying changes in environmental temperature in use of an HDD.

Moreover, an HDD is requested to be operable under severe conditions such as at a temperature of 90° C. (363 K) or −40° C. (233 K) as well as at room temperature. Common lead-free solder materials are alloys mainly composed of tin (Sn). These alloys undergo phase transformation (transition) as described in "The Third Face of Tin", Seizo Nagaskai, Kotai Butsuri, Solid Physics I (1967) pgs. 47-51, ("Non-Patent Document 1"). That is, if the operation temperature is lowered to −40° C. (233 K), a phase transformation from the β-Sn structure to the α-Sn structure occurs so that the solder joint gets likely to break for the helium gas to leak.

"The Simple Hexagonal to β-Sn Martensitic Transformation in Sn-(7.0-9.5) at % In Alloys", Y. Koyama and H. Suzuki, Acta Metal., 37 (1989) pgs. 597-602 ("Non-Patent Document 2") has reported that Sn-(7.0-9.5) at. % In alloys of the tin and indium (In) alloy system undergo martensitic transformation. If a martensitic transformation occurs between the simple hexagonal structure and the β-Sn structure, lenticular surface reliefs induced by the martensite are generated, which may develop a crack due to stress concentration caused by peaks and valleys of the reliefs. As a result, an HDD employing a structure with substituted helium has a possibility of helium gas leakage.

Japanese Patent No. 3562891 ("Patent Document 2") entitled "Lead-free solder and method for using the same" has proposed lead-free solder made of tin alloy which is composed of 0.1 to 57% of bismuth or 0.1 to 50% of indium and the remain of tin and common impurities, characterized by that the tin alloy further includes 0.001 to 5% of cobalt, the percentage of the bismuth is 5 to 57% excluding 5 to 7%, and the percentage of the indium is 3 to 50% excluding 3 to 7% in claim 1 in the scope of claims. However, it does not disclose the optimum composition range of the tin alloy with respect to the composition range of indium in the tin alloy for the mechanical reliability in a broad temperature range.

Similarly, in Japanese Patent Publication No. 2007-105750 ("Patent Document 3"), a 1000-cycle test is conducted with cycle condition of −40° C. to 125° C., 30 minutes of retention time, and 5 minutes of cycle transformation time, as described in the paragraph However, it does not propose the optimum composition range of a tin alloy in consideration of an aging effect caused by exposure at low temperature for a long time.

Consequently, a solder joint is demanded which is highly reliable in actual use of an HDD at −40° C. to 90° C., and does not break even after exposure at low temperature for a long time not to leak helium gas.

BRIEF SUMMARY OF THE INVENTION

Embodiments of the present invention provide a sealed HDD with high reliability. According to the embodiment of FIGS. 3(a) and 3(b), a HDD 1 is a hermetically sealed HDD. A base 102 has an opening 251 of a through-hole on its bottom; a feedthrough 150 is provided so as to close the opening 251. A flange 151 of the feedthrough 150 has a larger outline than the opening 251, and its rim is joined to the base 102 with solder at the solder joint 261. The solder at the solder joint 261 is mainly composed of Sn and contains 15 atomic percent to 27 atomic percent of indium. This solder reaches the γ phase from −150° C. to 120° C. Accordingly, even if the HDD 1 has been exposed at low temperature for a long time, the solder joint 261 is not broken so that helium gas does not leak.

DETAILED DESCRIPTION OF THE INVENTION

Embodiments of the present invention relate to a data storage device, and more particularly to a solder joint in a data storage device with low density gas enclosed inside a sealed enclosure thereof.

A data storage device according to an aspect of embodiments of the present invention comprises a sealed enclosure, a storage medium in the enclosure, a connector joined to the enclosure for transmitting signals between the storage medium and an external host, and solder for joining the connector to the enclosure. This solder comprises the first main component of tin and the second main component of indium, the crystal structure formed by the first main component of tin and the second main component of indium being a simple hexagonal structure at least within a temperature range of −40° C. to 90° C. Since the solder having this composition and crystal structure does not undergo structural phase transformation within the temperature range of −40° C. to 90° C., the reliability in solder joining can be increased.

A data storage device according to another aspect of embodiments of the present invention comprises a sealed enclosure, a storage medium in the enclosure, a connector fixed to the enclosure for transmitting signals between the recording medium and an external host, and solder for joining the connector to the enclosure. This solder contains the main component of tin and 15 atomic percent to 27 atomic percent of indium. Since the solder having this composition and crystal structure does not undergo structural phase transformation within the temperature range of −40° C. to 90° C., the reliability in solder joining can be increased.

The solder may contain at least one element selected from a group of cobalt, silver, and copper as an additive element. These additive elements produce an intermetallic compound with tin to decrease the speed of crack development. More preferably, the solder contains 0.001 atomic percent to 1 atomic percent of cobalt; the solder contains 0.1 atomic percent to 3.8 atomic percent of silver; or the solder contains 0.1 atomic percent to 1.3 atomic percent of copper. This lowers the melting point of the solder and forms an intermetallic compound with tin to reduce the developing speed of a crack.

In one example, the connector comprises a flange, a pin fixed to the flange, and a sealant for filling a gap between the flange and the pin. The solder of embodiments of the present invention is particularly useful to joining the connector.

According to embodiments of the present invention, an optimized solder composition can provide a highly reliable data storage device capable of preventing a crack of solder and a break in a component caused by development of the crack even if the device has been left at −40° C.

Hereinafter, particular embodiments of the present invention will be described. For clarity of explanation, the following description and the accompanying drawings contain omissions and simplifications as appropriate. Throughout the drawings, like components are denoted by like reference numerals, and their repetitive description is omitted if not necessary for clarity of explanation. In the embodiments, a hard disk drive (HDD) will be described as an example of a data storage device. An HDD according to embodiments of the present invention comprises a hermetically sealed enclosure and low density gas is enclosed inside thereof. Although hydrogen and helium are examples of the low-density gas, helium is optimum because it is much effective, stable, and safe. Therefore, an example where helium is used will be described hereinafter.

Figure 1:
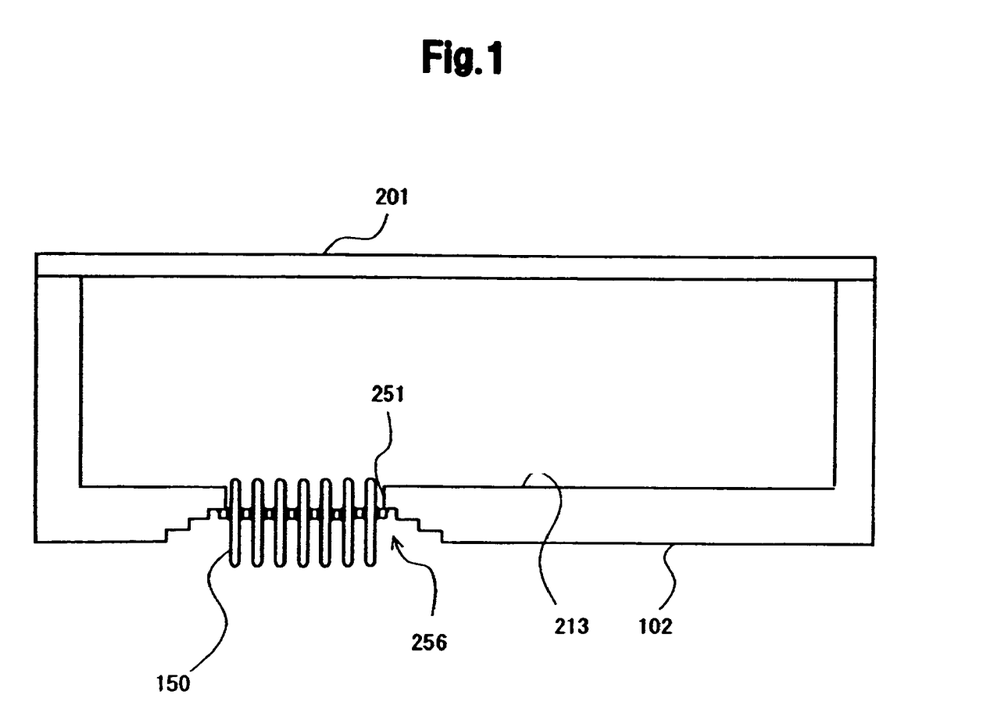
FIG. 1 is a cross-sectional view schematically depicting a base, a top cover, and a feedthrough joined to the base according to an embodiment.
Figure 2:
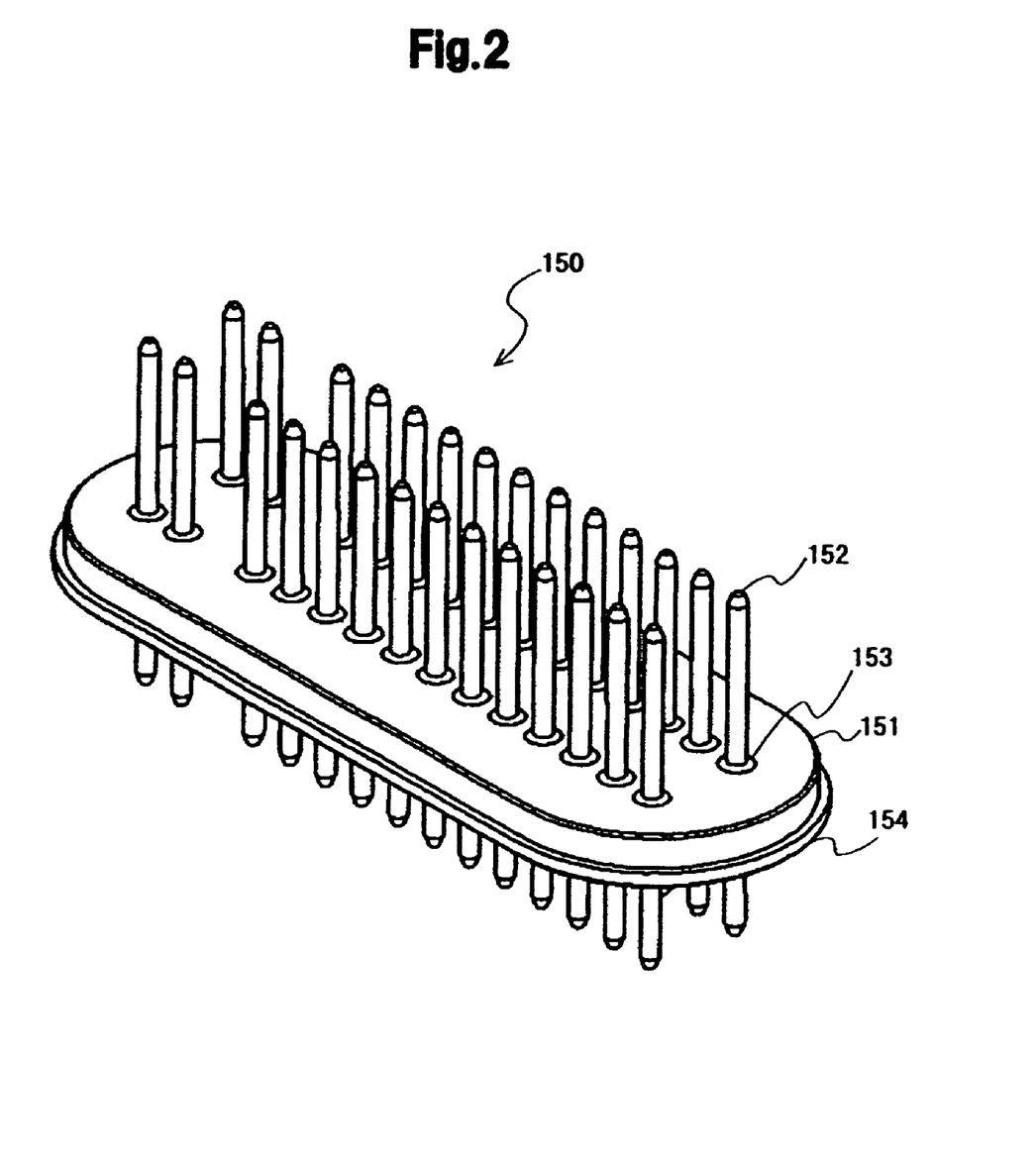
FIG. 2 is a perspective view schematically depicting the structure of a feedthrough, where the side to be exposed to the outside the HDD 1 faces up.

A feature of one embodiment is joining a feedthrough, which is an example of a connector for a base of an HDD. In the present embodiment, the feedthrough is joined to an enclosure by soldering. FIG. 1 is a cross-sectional view schematically depicting a base 102, a top cover 201, and a feedthrough 150 joined to the bottom of the base 102. In FIG. 1, components inside the enclosure are omitted. They will be described later. FIG. 2 is a perspective view schematically depicting the structure of the feedthrough 150, where the side to be exposed to the outside of the HDD 1 faces up.

As shown in FIG. 1, the base 102 has an opening 251 which is a through-hole on its bottom and the feedthrough 150 is placed so as to infill the opening 251. Also, the feedthrough 150 is placed in a depressed part 256 formed on the outer bottom surface of the base 102. As shown in FIG. 2, the feedthrough 150 comprises a flange 151 and a plurality of pins 152 which penetrate the flange 151 and are vertically supported by the flange 151. Sealants 153 of glass, ceramic, or the like are filled around the pins 152 and hermetically seal the gaps between the pins 152 and the flange 151. The pins 152 are connected electrically and physically to an FPC connector 121 inside the housing space and are connected electrically and physically to the control circuit board (not shown in FIG. 2) outside the base 102.

Figure 3:
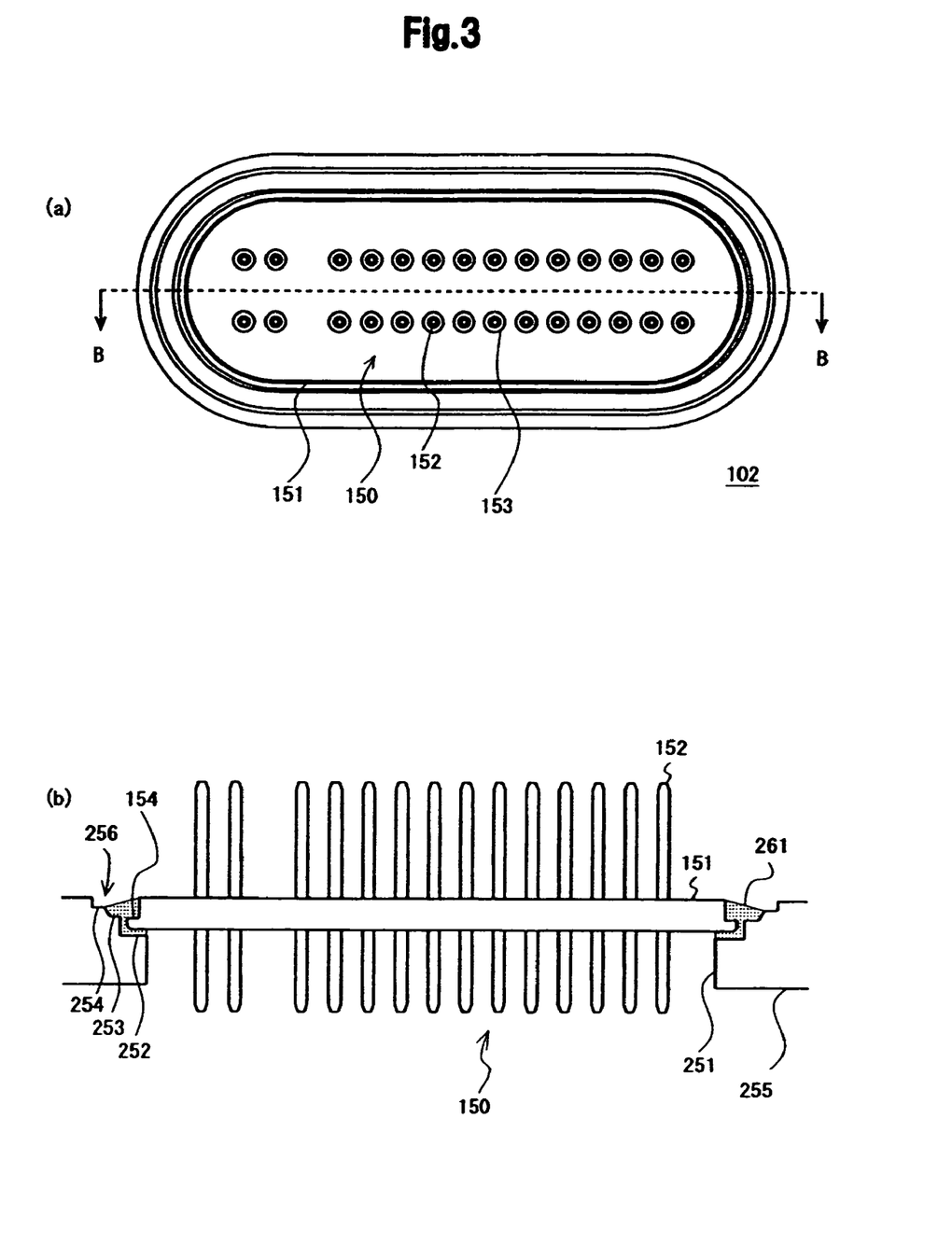
FIGS. 3(a) and 3(b) are views schematically depicting the structure of the feedthrough joined to a base and its vicinity according to an embodiment.

Since the hermetically sealed HDD is required to retain the enclosed helium of low density gas, high gas tight performance is demanded for joining the feedthrough 150 and the base 102. Therefore, the gap between the feedthrough 150 and the base 102 is sealed by soldering. FIG. 3(a) is a plan view schematically depicting the structure of the feedthrough 150 and its vicinity, as viewing the bottom of the base 102 from the outside of the HDD 1. FIG. 3(b) is a cross-sectional view along the B-B sectional line of FIG. 3(a). In FIG. 3(b), the lower part thereof is the sealed interior space of the HDD 1.

As shown in FIG. 3(a), the feedthrough 150 comprises pins 152 aligned in double rows. The direction in which the each row extends is the longitudinal direction and the direction vertical thereto in which each row is aligned side by side is the transverse direction. The outline of the feedthrough 150, namely the outline of the flange 151, has an oval shape and has two sides in parallel lines extending in the longitudinal direction and two half-circled sides which connect the side ends.

As shown in FIG. 3(b), an opening 251 penetrating the base 102 is provided on the bottom of the base 102 and a mounting surface 252 for the feedthrough 150 is provided around the opening 251 on the outer side of the device. The feedthrough 150 is attached to the base 102 from the outside of the base so as to hermetically close the opening 251 of the base 102. The flange 150 of the feedthrough 105 has a larger outline than the opening 251 and its rim are joined to the base 102 with solder at the solder joint 261.

Specifically, as shown in FIG. 3(b), the mounting surface 252 is one of a plurality of tiers which are formed toward the outside of the base as viewed from the opening 251. Specifically, the depressed part 256 around the opening 251 is formed on the outer bottom surface 255 of the base 102 and three tiers 252 to 254 which are different in level are formed in the depressed part 256. Each of the tiers 252 to 254 is formed so as to surround the rim of the opening 251. The tier 252 which is the closest to the opening 251 and defines the outer edge of the opening 251 is the feedthrough mounting surface 252.

The outline of the flange 151 of the feedthrough 150 is larger than the opening 251. The rim of the flange 151 is placed on the feedthrough mounting surface 252 from the outside of the base 102 and is joined to the depressed part 256 of the base 102 by soldering to form the solder joint 261. The solder joint 261 is formed between the bottom surface of the flange 151 and the feedthrough 150 mounting surface 252 as well as between the side surface of the flange 151 and the inner surface of the depressed part 256.

The material of the flange 151 is selected so as to suit the sealant 153 of glass or the like and the material of the base 102 and to reduce the stress on the sealant 153 and the solder joint 261. If the base 102 is made of aluminum, the flange 151 is preferably made of steel or stainless steel. This is because the thermal expansion coefficients thereof are between the thermal expansion coefficients of aluminum and of glass. Specifically, the thermal expansion coefficient of the sealant 153 of glass or the like is approximately 10 ppm/° C. at maximum, the one of steel is approximately 13 to 17 ppm/° C., and the one of aluminum die-casting material is substantially 20 ppm/° C.

Figure 4:
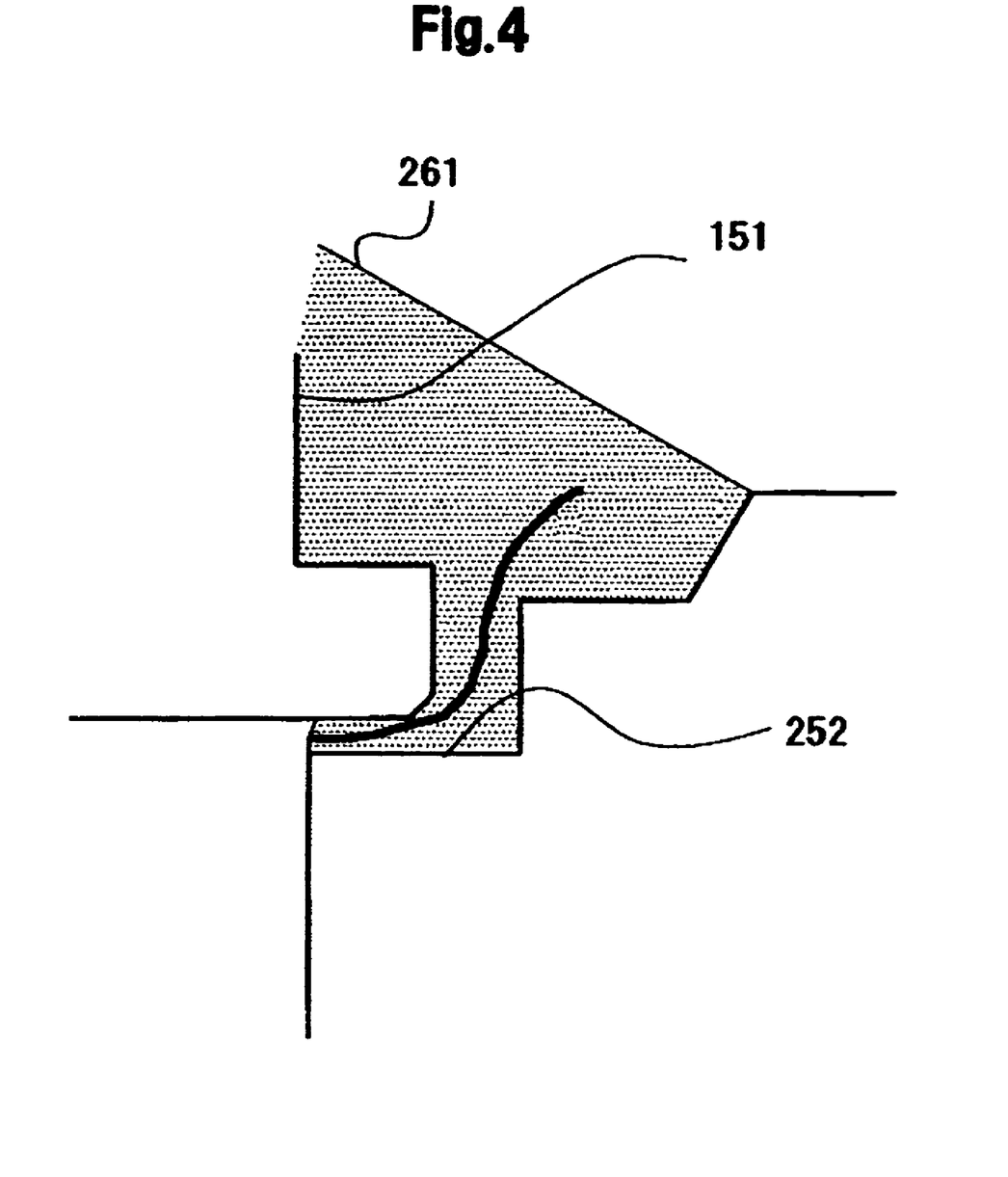
FIG. 4 is an enlarged cross-sectional view schematically depicting a configuration of a solder joint according to an embodiment.

Here, the material yield stress of solder is lower than the ones of common metals such as steel, aluminum, and the like. Since there is a difference in thermal expansion coefficient between the materials of the flange 151 of the feedthrough 150 and of the base 102, stress is added to the solder joint 261 which has a smaller yield stress by the deformation accompanying changes of the temperature environment in use of the HDD 1. If the yield stress at the solder joint 261 is too small, a crack 271 is generated at the solder joint 261 and a through path is generated in the solder joint 261 so that a sufficient sealing performance may not be assured.

Accordingly, it is necessary that the solder joint 261 be made of a solder to be able to endure a certain stress. For using a lead-free solder mainly composed of tin (Sn), it is necessary to take account of structural phase transformation accompanying temperature change. A preferred lead-free solder is an alloy containing a first main component of tin and a second main component of indium (In), where the first main component is the component with the largest rate of content and the second main component is the component with the next largest rate of content.

It has been known that tin alloys exhibit phase transformation (transition) with temperature. A typical phase transformation is a phase transformation between the β-Sn structure and the α-Sn structure. This phase transformation increases the possibility of break in the solder joint 261 to leak helium gas. Besides, Sn-(7.0-9.5) at. % In alloys in the tin and indium alloy system undergo martensitic transformation. If a martensitic transformation occurs between the simple hexagonal structure and the β-Sn structure, lenticular surface reliefs induced by the martensite may be generated at the solder joint 261, which may develop a crack due to stress concentration caused by peaks and valleys of the reliefs. As a result, a possibility for helium gas to leak through the solder joint 261 arises.

One embodiment uses a solder with the composition range where structural phase transformation does not occur within a temperature range of −40° C. to 90° C. in an HDD 1 assuring operation at subfreezing temperatures, particularly a hermetically sealed HDD 1 filled with helium gas of low density gas for attaining a high TPI. Specifically, Sn—In series alloys are used as the solder material and their compositions are selected to be in the γ phase and not to undergo phase transition into another phase in the above temperature range. This accomplishes high reliability in a hermetically sealed structure under designed use (operational) conditions for the HDD 1.

Figure 5:
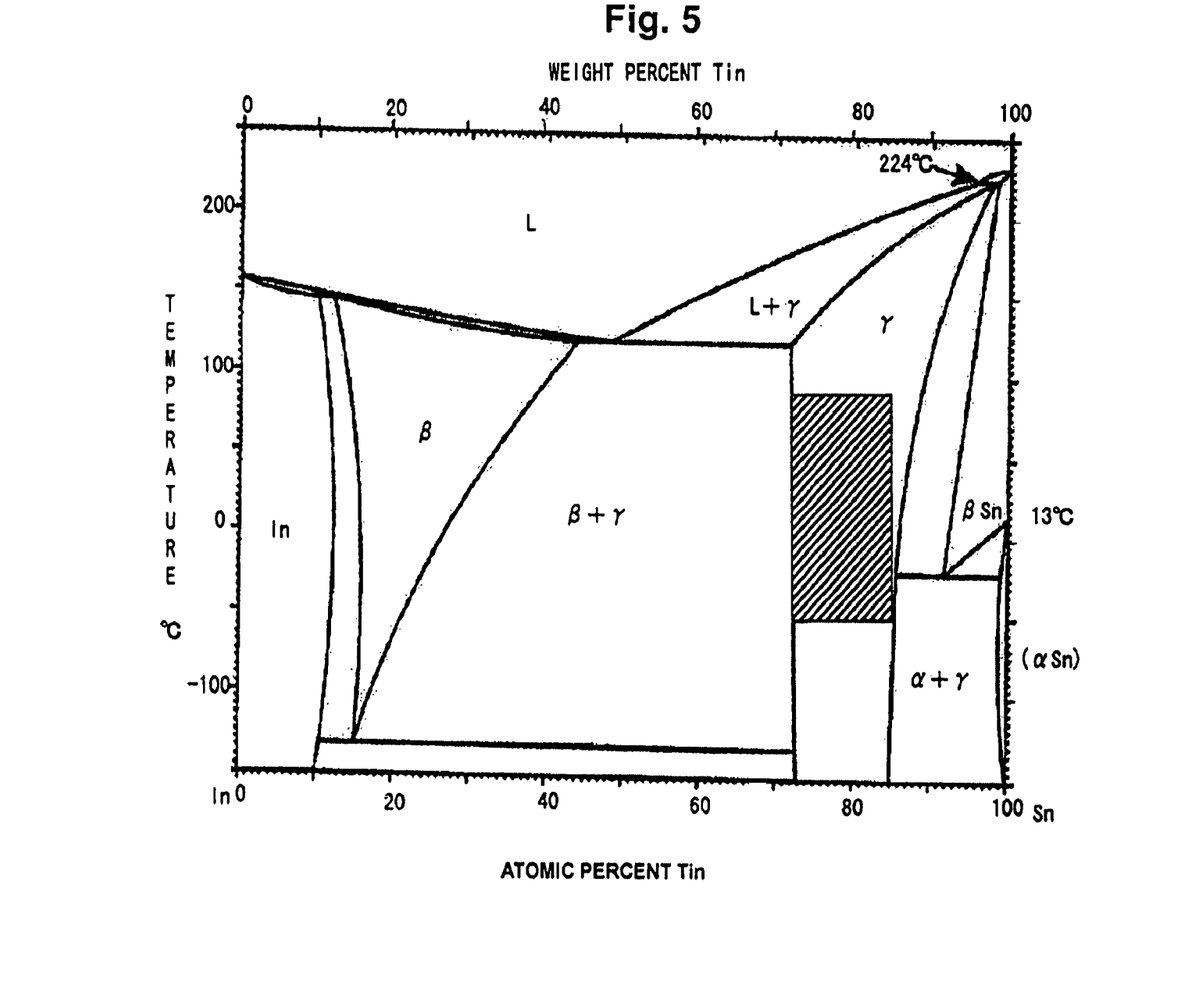
FIG. 5 is a phase equilibrium diagram of Sn—In system.

FIG. 5 is a phase equilibrium diagram of the Sn—In system. In FIG. 5, the vertical axis represents temperature; the horizontal axis represents composition in atomic percent or weight percent. The most left point in the horizontal axis represents a composition with 100% of In and the most right position represents a composition with 100% of Sn. As traveling from the left to the right along the horizontal axis, the rate of content of In decreases and the one of Sn increases. In this diagram, L denotes liquid; and α, β, and γ denote the phases of the solids. The symbol x+y means that two phases of x and y coexist. This diagram is cited from Phase Diagrams for Binary Alloys, ASM International, Materials Park, Ohio, (2000) pg. 491 ("Non-Patent Document 3").

In one embodiment, Sn—In series alloys with the compositions to be in the simple hexagonal structure in the temperature range of at least −40° C. to 90° C. are used as the solder material for the solder joint 261. They are the Sn—In series alloys whose compositions are in the hatched area in the diagram of FIG. 5. More specifically, Sn-(15-27) at. % In alloys which are in the γ phase within the range of −150° C. to 120° C. are used.

The alloys with these compositions are in a single phase area of the simple hexagonal structure within the range of −150° C. to 120° C. and do not undergo the structural phase transformation at normal pressures, so that mechanical reliability increases. Although the crystal structure may change if the air pressure significantly changes, such a change in the air pressure substantially does not occur in the actual use environment of the HDD 1. Therefore, use of the Sn—In series alloys which can maintain their simple hexagonal structure within the temperature range of −40° C. to 90° C. at 1 atm accomplishes a highly reliable solder joint 261.

As understood from the phase equilibrium diagram of FIG. 5, Sn—In alloys with In content of less than 15 at. % undergo a phase transformation from the simple hexagonal structure to the β-Sn structure or get into a two-phase coexistent state with decrease in temperature. The precipitated β-Sn is not preferable since it may transform into the α-Sn due to further temperature decrease or stress concentration. The Sn—In alloys with In content of more than 27 at. % are not preferable either since the β phase having the fct(bct) structure is precipitated from the mother phase of the y phase as the second phase so that separation into two phases progresses to induce segregation that may cause stress concentration at the grain boundaries.

A small amount of another specific element may be added to the Sn—In alloy to be used as the solder material at the solder joint 261. Specifically, any silver (Ag), copper (Cu), and/or cobalt (Co) may be added. These additive elements form intermetallic compounds with Sn to reduce the developing speed of a crack in the solder joint 261.

The particularly preferable rates of content of Co, Ag, and Cu are 0.001 to 1 at. %, 0.1 to 3.8 at. %, and 0.1 to 1.3 at. %, respectively. The additive elements within these ranges can lower the melting point of solder and form intermetallic compounds which slow the development of a crack. This increases the easiness in manufacture and reliability of the solder joint 261. Even if an additive element is added, the first and second main components of Sn and In form simple hexagonal structures and the second additive element generates a bit amount of intermetallic compound as a second phase.

As described above, controlling the composition of solder and using the solder which does not become the β-Sn structure within the guaranteed operational temperature for an HDD 1 prevents phase transformation of the solder with temperature change. This prevents the possibility of generation of a crack in the solder joint 261 and the risk of break in components induced by development of the crack even if an HDD 1 is left at −40° C. of the lowest guaranteed operational temperature, so that a highly reliable hermetically sealed HDD 1 can be provided.

Next, experimental results on the solder with composition according to embodiments of the present invention and comparative examples will be described. Sn-(15-27) at. % In alloys were used for the solder alloy for sealing an HDD with helium. Three types of alloys with typical compositions, a Sn-15 at. % In alloy, a Sn-21 at. % In alloy, and a Sn-27 at. % In alloy, were selected. Employing atomic masses of 118.71 for Sn and 114.81 for In, the three alloys correspond to approximately Sn-14.58 wt. % In, Sn-20.45 wt. % In, and Sn-26.35 wt. % In, respectively, in weight percent (wt. %).

The alloys were vacuum melted. The alloys are rolled into a plate with 0.8 mm thickness at room temperature and degreased, and then sealed in vacuum and solution treated at immediately below the melting point for three days. After that, the temperature was returned to room temperature with a change rate of approximately 1 K/s, and the alloys were chemical polished in the mixture of hydrofluoric acid and nitric acid, then their textures were observed at room temperature. As a result, segregations were not observed at grain boundaries. Besides, when the x-ray reflection curves of these alloys were measured using an x-ray diffractometer, only x-ray diffraction peaks which can be explained by the simple hexagonal structure were observed in a temperature range of −40° C. (233K) to 90° C. (363K). The x-ray source was the monochromatic copper characteristic x-ray through a Ni-filter. From these results, it has been revealed that phase separations do not progress in the Sn-(15-27) at. % In alloys within the guaranteed operational temperature range so that the high mechanical reliability can be obtained.

The alloy texture observations were conducted through the same heat treatment as the above example except for using a Sn-12 at. % In alloy, a Sn-13 at. % In alloy, and a Sn-29 at. % In alloy instead of the examples of embodiments of the present invention, Sn-(15-27) at. % In alloys. Further, shield files were experimentally manufactured using these three compositions of solder. The Sn-12 at. % In alloy corresponds to a Sn-11.65 wt. % In alloy; the Sn-13 at. % In alloy, to a Sn-12.63 wt. % In alloy; and the Sn-29 at. % In alloy, to a Sn-28.32 wt. % In alloy, in weight percent (wt. %), respectively.

As a result of the alloy texture observations, segregations at grain boundaries were not observed in the Sn-12 at. % in alloy or the Sn-13 at. % In alloy immediately after cooling into room temperature. Segregations at grain boundaries were observed in the Sn-12 at. % In alloy after two-day exposure at room temperature, and on the Sn-13 at. % In alloy, after three-day exposure at room temperature. It has been affirmed that there is no discrepancy between the phase equilibrium diagram and the measured x-ray reflection diffractive curves if the segregations are assumed to be precipitations of β-Sn. On the other hand, segregations at grain boundaries were observed in the Sn-29 at.In alloy. Since the x-ray reflection diffractive curve corresponding to this precipitation was also observed, it is assumed that the β phase with high In concentration was precipitated at grain boundaries. It has been revealed that the deformations at the grain boundaries are caused by the thermal history since the β phase has different solid solubility limits for In depending on changes in exposure temperature.

Figure 6:
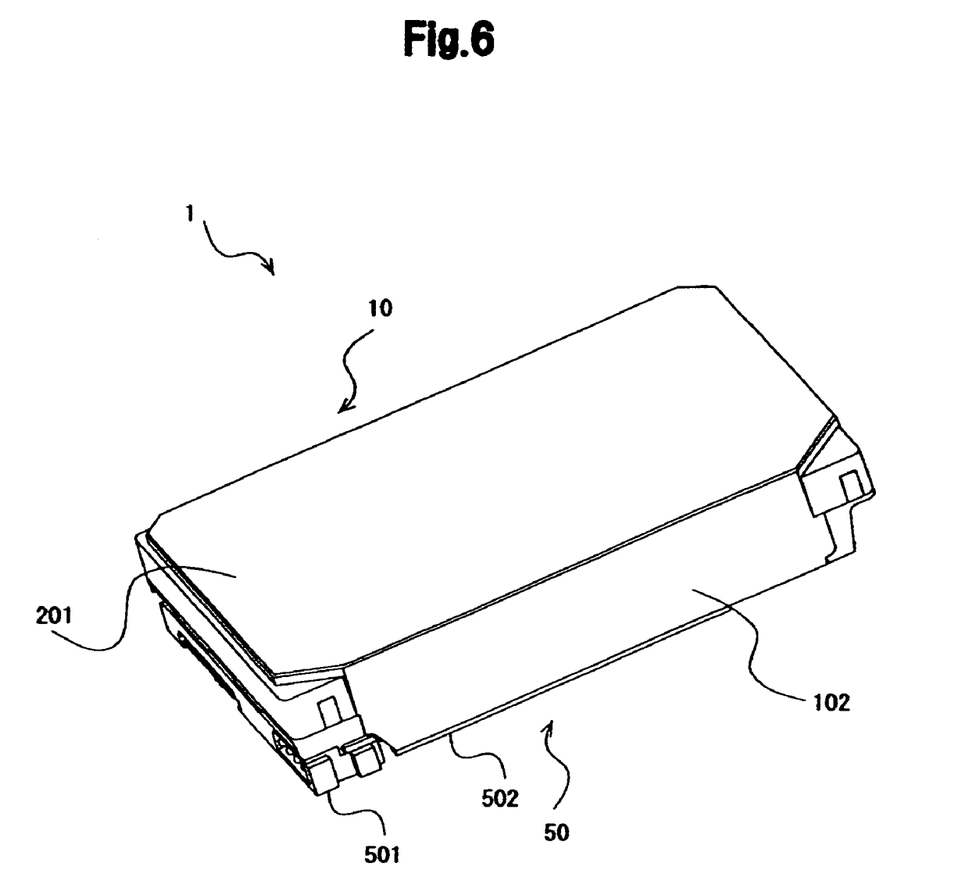
FIG. 6 is a perspective view schematically showing the configuration of a hermetically sealed HDD according to an embodiment.

Hereinafter, an entire configuration of an HDD 1 according to embodiments of the present embodiment will be described. FIG. 6 is a perspective view schematically showing the configuration of the hermetically sealed HDD 1 according to one embodiment. The HDD 1 comprises a head disk assembly (HDA) 10 and a control circuit board 50 fixed to the outer bottom surface of the HDA 10. An enclosure of the HDA 10 comprises a base 102 for housing components and a top cover 201 to close a top opening of the base 102. The base 102 and the top cover 201 are main parts of an enclosure. The HDD 1 contains helium gas sealed inside the enclosure. The control circuit board 50 has an interface connector 501 to an external host and a circuit board 502 on which the interface connector 501 and various ICs are mounted. Components consisting of a part of the HDA 10 are housed in the housing space formed by the base 102 and the top cover 201.

Figure 7:
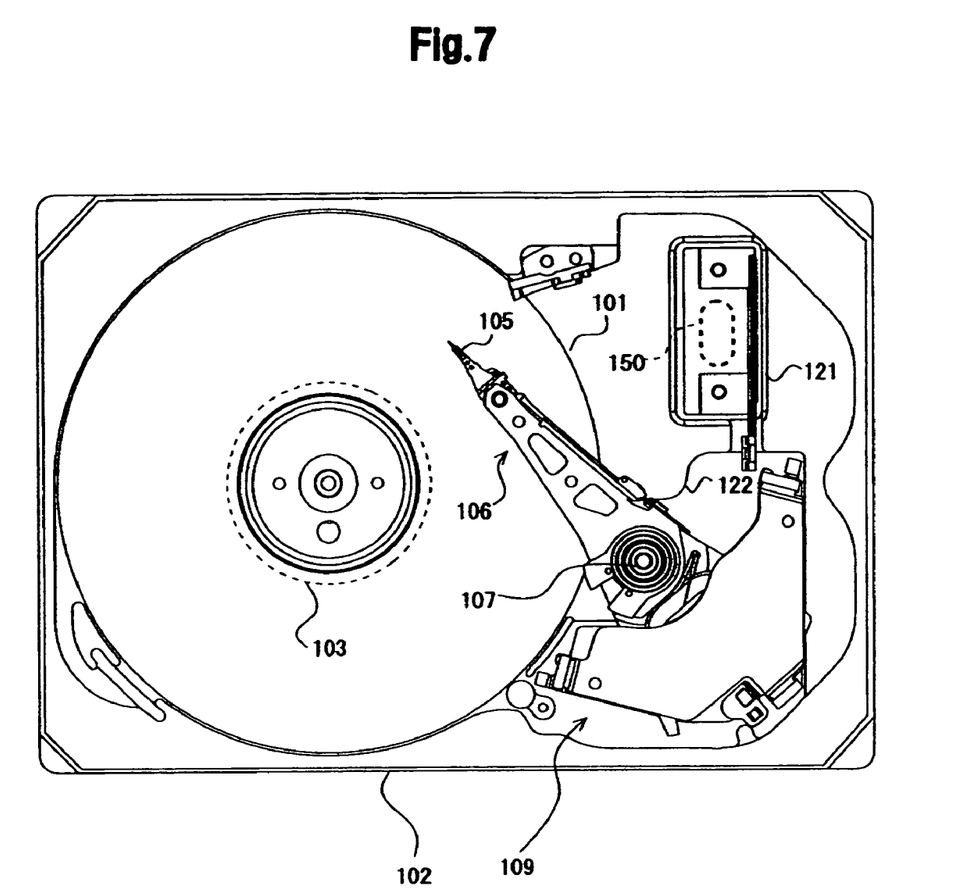
FIG. 7 is a top view schematically showing the inside structure of the HDD main unit according to an embodiment.

Operation of the components in the housing space shown in FIG. 7 is controlled by a control circuit on the control circuit board 50. A head slider 105 accesses a magnetic disk 101 to write and/or retrieve data. An actuator 106 supports the head slider 105 and pivots about a pivotal shaft 107 to move the head slider 105 over the magnetic disk 101. The actuator 106 is driven by a voice coil motor (hereinbelow referred to as VCM) 109. The assembly of the actuator 106 and the VCM 109 is a moving mechanism of the head slider 105. A spindle motor (SPM) 103 is fixed to the base 102 and rotates the magnetic disk 101 at a specific angular rate.

Signals between the control circuit on the control circuit board 50 and the VCM 109, between the control circuit and the SPM 103, and between the control circuit and the head slider are transmitted through a flexible printed circuit (FPC) 122 and an FPC connector 121. The FPC connector 121 is connected to the feedthrough 150, which is fixed to the bottom of the base 102 and connects the FPC connector 121 and the control circuit board 50 via circuitry (electrically) and physically. Accordingly, the feedthrough 150 transmits signals between the control circuit and the head slider, or between the host and the magnetic disk 101.

At the last, the manufacturing steps of an HDD 1 will be described. In manufacturing steps of an HDD 1, the base 102 is first manufactured by die-casting or cutting and then an opening is made on the bottom of the base 102. Next, a feedthrough 150 is joined to close the opening with solder. This solder is formed of a Sn—In series alloy with the above-described composition. Then, a head stack assembly (HSA) which is an assembly of the actuator 106 and the head slider 105, the SPM 103, the magnetic disk 101, and the like are mounted within the base 102 which has been joined with the feedthrough 150, and then the top cover 201 is secured to the base 101 in a helium gas atmosphere. Typically, the top cover 201 is secured to the base 101 by means of laser-welding or soldering. Thereby, helium gas is sealed in the interior space 213. Finally, the control circuit board 50 is mounted to the HDA 10 to finish the HDD 1.

As set forth above, the present invention has been described by way of particular embodiments, but it is not limited to the above-described embodiments. A person skilled in the art can easily modify and add each element in the above embodiments within the scope of the present invention. For example, embodiments of the present invention are useful particularly to HDDs but may be applied to other types of data storage devices. Further, in view of yield stress at the solder joint and contamination to the housing space due to solder joining, it is preferable that the feedthrough be placed outside of the base to be solder joined but it may be placed inside of the base to be solder joined according to the design. The feedthrough can be configured to transfer signals of the head slider and/or signals of the VCM.

What is claimed is:

1. A data storage device comprising:
   a sealed enclosure;
   a storage medium in the enclosure;
   a connector joined to the enclosure for transmitting signals between the storage medium and an external host; and
   solder for joining the connector to the enclosure comprising a first main component of tin and the second main component of indium, a crystal structure formed by the first main component of tin and the second main component of indium being a hexagonal structure within at least a temperature range of −40° C. to 90° C.

2. The data storage device according to claim 1, wherein the solder contains at least one element selected from a group of cobalt, silver, and copper as an additive element.

3. The data storage device according to claim 2, wherein the solder contains 0.001 atomic percent to 1 atomic percent of cobalt.

4. The data storage device according to claim 2, wherein the solder contains 0.1 atomic percent to 3.8 atomic percent of silver.

5. The data storage device according to claim 2, wherein the solder contains 0.1 atomic percent to 1.3 atomic percent of copper.

6. The data storage device according to claim 1, wherein the connector comprises a flange, a pin fixed to the flange, and a sealant for filling a gap between the flange and the pin.

7. A data storage device comprising:
   a sealed enclosure;
   a storage medium in the enclosure;
   a connector fixed to the enclosure for transmitting signals between the recording medium and an external host; and
   solder for joining the connector to the enclosure and containing a main component of tin and 15 atomic percent to 27 atomic percent of indium.

8. The data storage device according to claim 7, wherein the solder contains at least one element selected from a group of cobalt, silver, and copper as an additive element.

9. The data storage device according to claim 8, wherein the solder contains 0.001 atomic percent to 1 atomic percent of cobalt.

10. The data storage device according to claim 8, wherein the solder contains 0.1 atomic percent to 3.8 atomic percent of silver.

11. The data storage device according to claim 8, wherein the solder contains 0.1 atomic percent to 1.3 atomic percent of copper.

12. The data storage device according to claim 7, wherein the connector comprises a flange, a pin fixed to the flange, and a sealant for filling a gap between the flange and the pin.

* * * * *